United States Patent
Menheere et al.

(10) Patent No.: US 11,732,609 B2
(45) Date of Patent: Aug. 22, 2023

(54) CONNECTING ARRANGEMENT BETWEEN COMPONENTS OF AN AIRCRAFT ENGINE

(71) Applicant: PRATT & WHITNEY CANADA CORP., Longueuil (CA)

(72) Inventors: David Menheere, Norval (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/452,917

(22) Filed: Oct. 29, 2021

(65) Prior Publication Data

US 2023/0136870 A1    May 4, 2023

(51) Int. Cl.
*F01D 25/24* (2006.01)

(52) U.S. Cl.
CPC ........ *F01D 25/24* (2013.01); *F05D 2220/323* (2013.01); *F05D 2220/76* (2013.01); *F05D 2230/60* (2013.01); *F05D 2300/133* (2013.01); *F05D 2300/17* (2013.01)

(58) Field of Classification Search
CPC ............... F01D 25/24; F05D 2220/323; F05D 2220/76; F05D 2230/60; F05D 2300/133; F05D 2300/17
See application file for complete search history.

(56) References Cited

U.S. PATENT DOCUMENTS

| | | | | |
|---|---|---|---|---|
| 4,552,386 A | * | 11/1985 | Burchette | F16L 23/24 |
| | | | | 285/414 |
| 5,867,979 A | * | 2/1999 | Newton | F02C 3/113 |
| | | | | 310/90.5 |
| 7,686,575 B2 | | 3/2010 | Chehab et al. | |
| 8,997,496 B2 | * | 4/2015 | Pelletier | B64G 1/401 |
| | | | | 60/770 |
| 2006/0013681 A1 | * | 1/2006 | Cardarella | F01D 11/22 |
| | | | | 415/1 |

(Continued)

FOREIGN PATENT DOCUMENTS

| | | |
|---|---|---|
| EP | 2325454 B1 | 3/2015 |
| EP | 4098858 A1 | 12/2022 |
| GB | 2547108 A * | 8/2017 ............. F01D 25/12 |

OTHER PUBLICATIONS

European Search Report issued in counterpart EP application No. 22204812.6 dated Mar. 23, 2023.

*Primary Examiner* — Woody A Lee, Jr.
*Assistant Examiner* — Joshua R Beebe
(74) *Attorney, Agent, or Firm* — Norton Rose Fulbright Canada LLP

(57) ABSTRACT

An aircraft engine comprises a casing extending circumferentially around a central axis. A support flange is secured to the casing and extends circumferentially around the axis. The support flange has an inner and an outer flange face. A component is drivingly engaged by a shaft of the engine. The component has a connecting section extending around the central axis. The connecting section has a connecting face. The inner flange face is in abutment against the connecting face. A retaining ring extends circumferentially around the central axis. The retaining ring is in abutment against the outer flange face of the support flange. The retaining ring has a coefficient of thermal expansion, which is less than that of the support flange.

19 Claims, 5 Drawing Sheets

(56) References Cited

U.S. PATENT DOCUMENTS

| | | | |
|---|---|---|---|
| 2013/0133336 A1* | 5/2013 | Barnett | F01D 15/10 248/671 |
| 2014/0079530 A1* | 3/2014 | Ferch | F01D 15/10 415/1 |
| 2016/0123172 A1 | 5/2016 | Mondal et al. | |
| 2017/0227152 A1 | 8/2017 | Tyburcy et al. | |
| 2020/0131922 A1* | 4/2020 | Mondal | F01D 25/005 |
| 2021/0164367 A1* | 6/2021 | Kelford | F01D 25/243 |
| 2022/0298990 A1* | 9/2022 | Chapelle | F02K 1/80 |

* cited by examiner

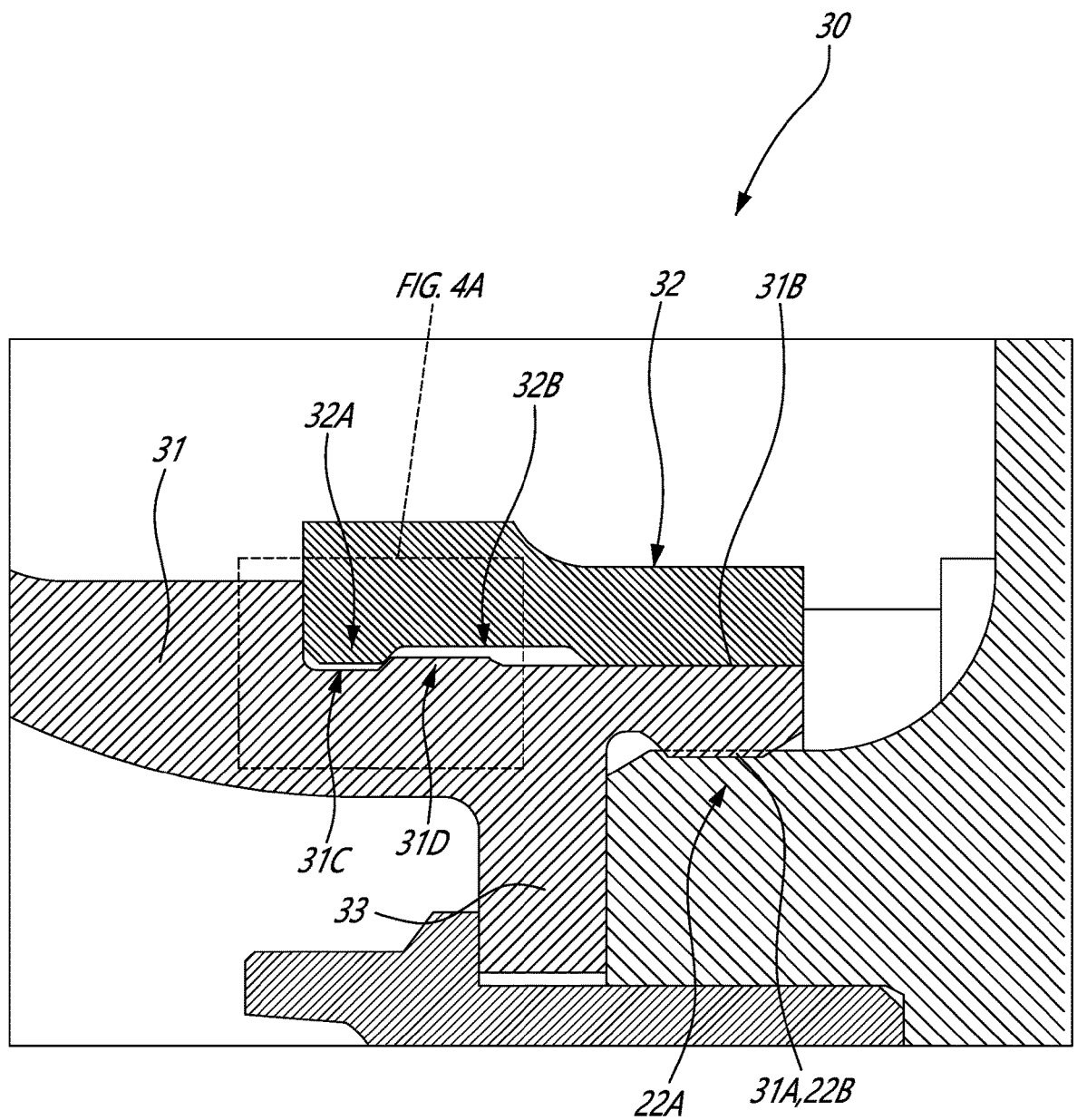

500

Engage a connecting section of the component to a support flange secured to the casing, the support flange including a first material —502

Dispose a retaining ring around the support flange and in abutment against the support flange to sandwich the support flange between the connecting section and the retaining ring, the retaining ring including a second material having coefficient of thermal expansion being less than that of the first material. —504

FIG. 5

CONNECTING ARRANGEMENT BETWEEN COMPONENTS OF AN AIRCRAFT ENGINE

TECHNICAL FIELD

The application relates generally to aircraft engines and, more particularly, to systems and methods used to secure together different components of such engines.

BACKGROUND OF THE ART

In an aircraft engine, some components are secured to one another via mating sections. However, in use, the aircraft engine is subjected to temperatures variations that may induce thermal growth of these mating sections. Because the sections may be made of different material, the thermal growth may vary between them. This may affect how these components are secured together. Hence, improvements are sought.

SUMMARY

In accordance with a general aspect of the disclosure, there is provided an aircraft engine, comprising: a casing extending circumferentially around a central axis; a support flange secured to the casing and extending circumferentially around the central axis, the support flange having an inner flange face facing the central axis and an outer flange face facing away from the central axis, the support flange including a first material; a component drivingly engaged by a shaft of the aircraft engine, the component having a connecting section extending around the central axis, the connecting section having a connecting face facing away from the central axis, the inner flange face in abutment against the connecting face; and a retaining ring extending circumferentially around the central axis, the retaining ring in abutment against the outer flange face of the support flange, the retaining ring including a second material having a coefficient of thermal expansion being less than that of the first material of the support flange.

In accordance with another general aspect, there is provided a connecting system for connecting a component to a casing of an aircraft engine, comprising: a support flange secured to the casing, the support flange extending circumferentially around an axis, the support flange having an inner flange face facing the axis and an outer flange face facing away from the axis, the support flange including a first material, the inner flange face in abutment against a connecting section of the component; and a retaining ring extending circumferentially around the axis, the retaining ring in abutment against the outer flange face of the support flange, the retaining ring including a second material having a coefficient of thermal expansion being less than that of the first material of the support flange such that thermal expansion of the support flange is impeded by the retaining ring.

In accordance with another aspect, there is provided method of mounting a component to a casing of a aircraft engine, comprising: engaging a connecting section of the component to a support flange secured to the casing, the support flange including a first material; and disposing a retaining ring around the support flange and in abutment against the support flange to sandwich the support flange between the connecting section and the retaining ring, the retaining ring including a second material having coefficient of thermal expansion being less than that of the first material.

DESCRIPTION OF THE DRAWINGS

Reference is now made to the accompanying figures in which:

FIG. 3 is an enlarged view of a portion of FIG. 2;

FIG. 5 is a flowchart illustrating steps of mounting a component to a casing of the engine of FIG. 1.

DETAILED DESCRIPTION

Figure 1:
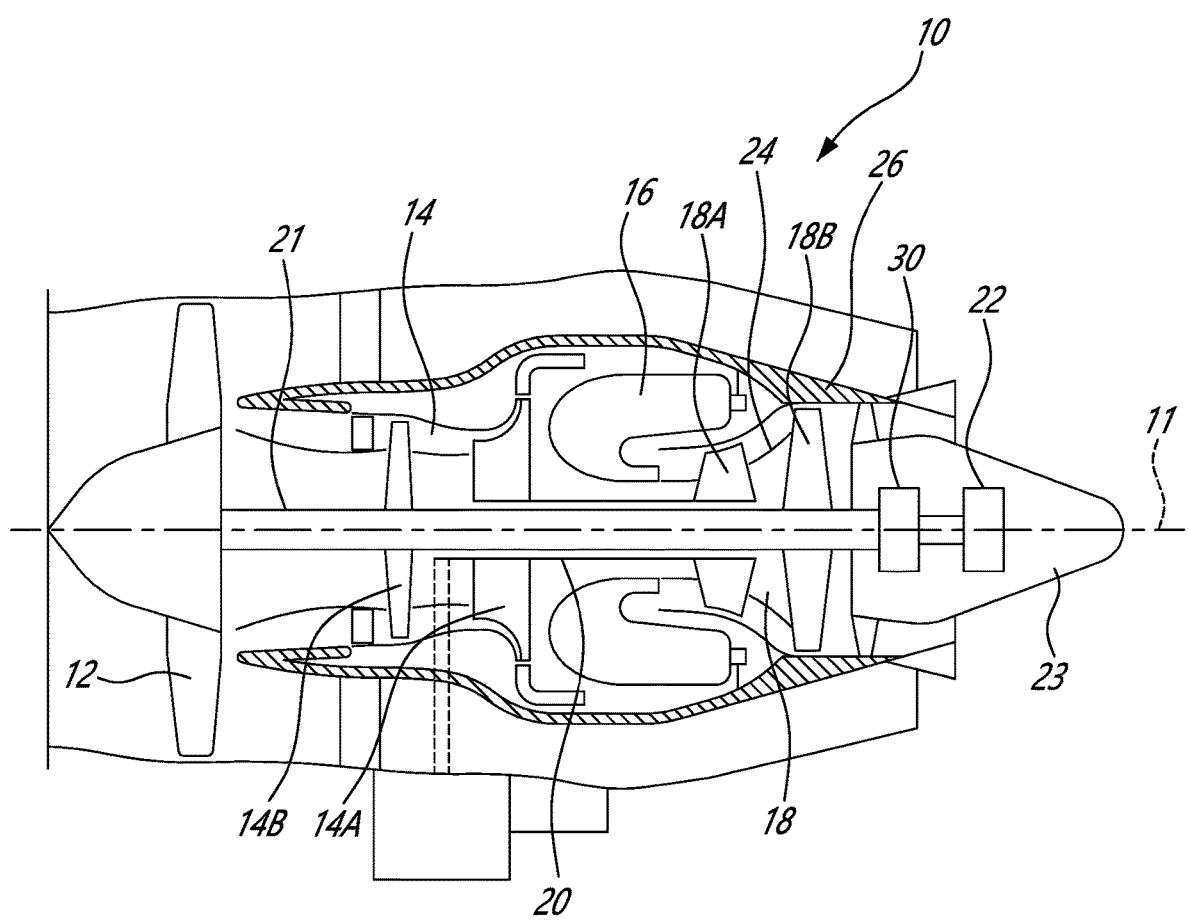
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

Another component 22, such as an accessory, herein a generator, is drivingly engaged by the low-pressure shaft 21 via a connecting arrangement or connecting system 30, which will be described further below. The component 22 may be an accessory, such as a pump, an electrical motor, and so on. The component 22 may be located within a tail cone 23 of the gas turbine engine 10.

Figure 2:
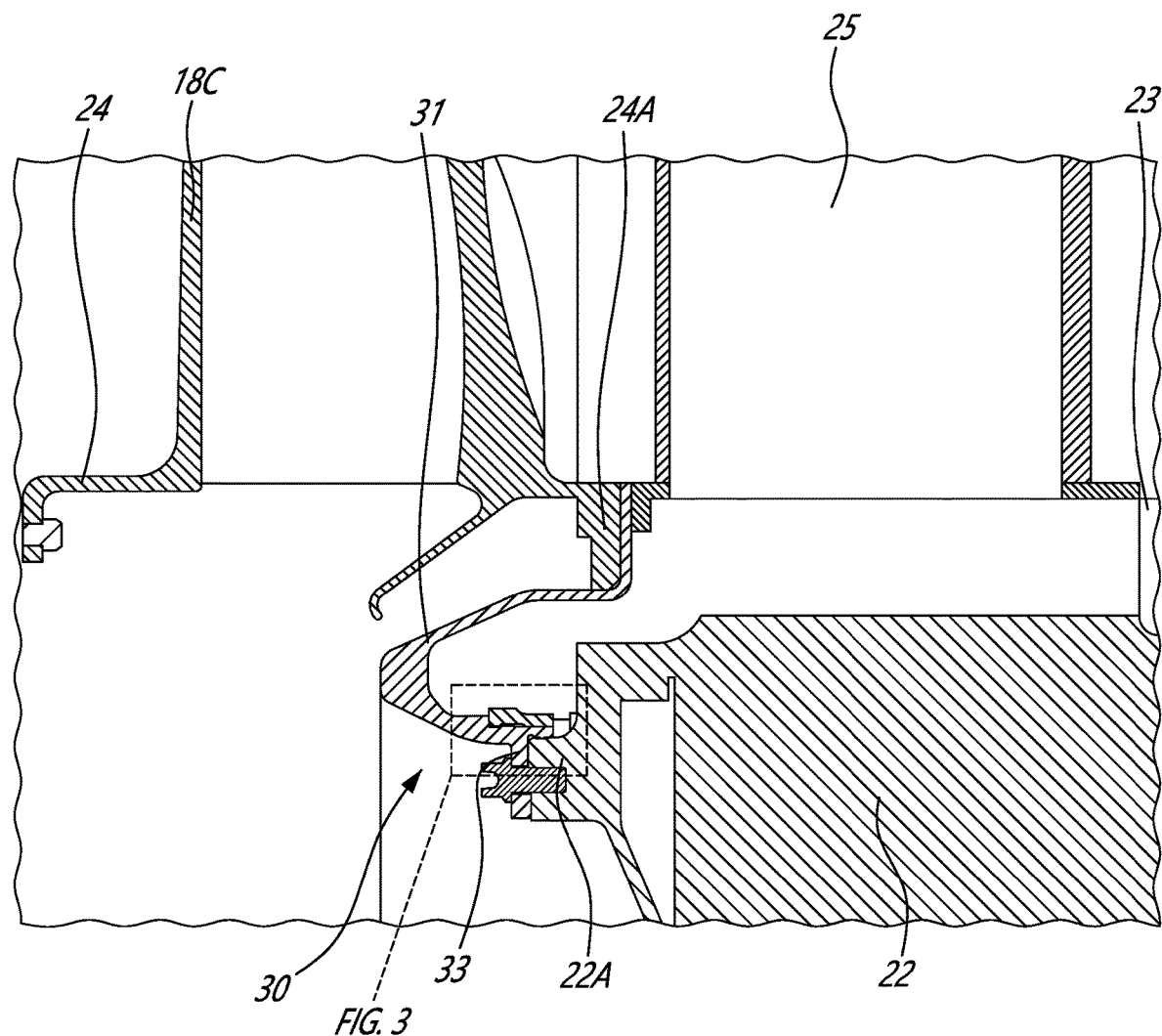
FIG. 2 is a schematic cross-sectional view of a portion of the gas turbine engine of FIG. 1.

Referring to FIGS. 2-3, a portion of the gas turbine engine 10 proximate the tail cone 23 and illustrating the connecting system 30 is shown. The gas turbine engine 10 includes an inner casing 24 defining a flange 24A. The flange 24A may be located axially between a vane 18C of the turbine section 18 and a support strut 25 that extends radially outwardly from the tail cone 23 and that is connected at its outer end to an outer casing 26 (FIG. 1) of the gas turbine engine 10. The connecting system 30 includes a support flange 31 that is mounted (e.g., fastened, welded, etc) to the flange 24A of the inner casing 24. In some embodiments, the support flange 31 may be monolithic with the inner casing 24. In the embodiment shown, the component 22 as a connecting section 22A. The connecting section 22A is sized to be secured to the support flange 31. In the present embodiment, the connecting section 22A defines a substantially cylindrical face 22B and the support flange 31 defines a substantially cylindrical recess that is sized to receive the connecting section 22A of the component 22. A spigot fit may therefore be created between the connecting section 22A and the support flange 31. Hence, to assemble the component 22 to the support flange 31, the connecting section 22A is inserted in an axial direction relative to the central axis 11 in the recess. An annular web 33 extend substantially transversely from a distal end of the support flange 31 toward the central axis 11. The connecting section 22A may be bolted or fastened in any suitable way to the annular web 33. The annular web 33 and the connecting section 22A may define registering apertures circumferentially distributed about the central axis 11 for receiving suitable fasteners.

Referring more particularly to FIG. 3, the support flange 31 may extend circumferentially all around the central axis 11. The support flange 31 as an inner flange face 31A that faces the central axis 11 and an outer flange face 31B that faces away from the central axis 11. The support flange 31 includes a first material, which may be INCONEL 718™. As shown in FIG. 3, the connecting section 22A of the component 22 is secured to the support flange 31. In the depicted embodiment, the connecting section 22A is in abutment against the inner flange face 31A of the support flange 31. A tight fit engagement or compression fit may be provided between the connecting section 22A of the component 22 and the support flange 31.

In use, the temperature inside the gas turbine engine 10 may be such that the different components increase in dimension with heat. In the present case, the coefficient of thermal expansion of the support flange 31 may be greater than that of the connecting section of the component 22. Therefore, the engagement between the support flange 31 and the component 22 may become loose when the gas turbine engine 10 is at operational temperatures because the diameter of the support flange 31 may increase more than a diameter of the connecting section 22A of the component 22.

Still referring to FIG. 3, in the present embodiment, a retaining ring 32 is mounted to the support flange 31. More specifically, the retaining ring 32 may be in abutment against the outer flange face 31B of the support flange 31. The retaining ring 32 may extend circumferentially all around the central axis 11. According to at least one embodiment, the retaining ring 32 is configured to have an interference fit with the support flange 31. In some embodiments, the retaining ring 32 may include a plurality of ring sections circumferentially distributed around the central axis 11 and secured to one another. The retaining ring 32 may include a second material that has a coefficient of thermal expansion that is less than that of the first material of the support flange 31. The second material may include, for instance, titanium. Therefore, in use when the support flange 31 increases in diameter because of thermal expansion it is restrained by the retaining ring 32 that also increases because of thermal expansion, but less then the support flange 31 because of the differences in their coefficients of thermal expansion. Consequently, during an increase of temperature inside the gas turbine engine 10, the support flange 31 may remain securely connected to the connecting section 22A of the component 22 thanks to the retaining ring 32 that maintains proper engagement between the support flange 31 and component 22. Stated differently, thermal expansion of the support flange 31 may be impeded by the retaining ring 32.

In some embodiments, it was observed that repeated cycles of heating and cooling cycles with starting and shutting down the gas turbine engine 10 resulted in the retaining ring 32 moving axially relative to the central axis 11 and relative to the support flange 31. In some cases, this resulted in the retaining ring slipping off the support flange 31. As will be explained below, the present connecting system 30 as features that may limit the situation from arising.

Still referring to FIG. 3, in the present embodiment, the outer flange face 31B defines a flange recess 31C and the retaining ring 32 defines a ring protrusion 32A that extends toward the central axis 11. The ring protrusion 32A is at least partially received within the flange recess 31C. The retaining ring 32 may therefore be axially locked relative to the support flange 31 by the engagement of the ring protrusion 32A inside the flange recess 31C. The retaining ring 32 may also define a ring recess 32B that partially receives a flange protrusion 31D defined by the outer flange face 31B of the support flange 31. An axial width of the ring recess 32B of the retaining ring 32 is greater than an axial width of the flange protrusion 31D of the support flange 31.

Figure 4A:
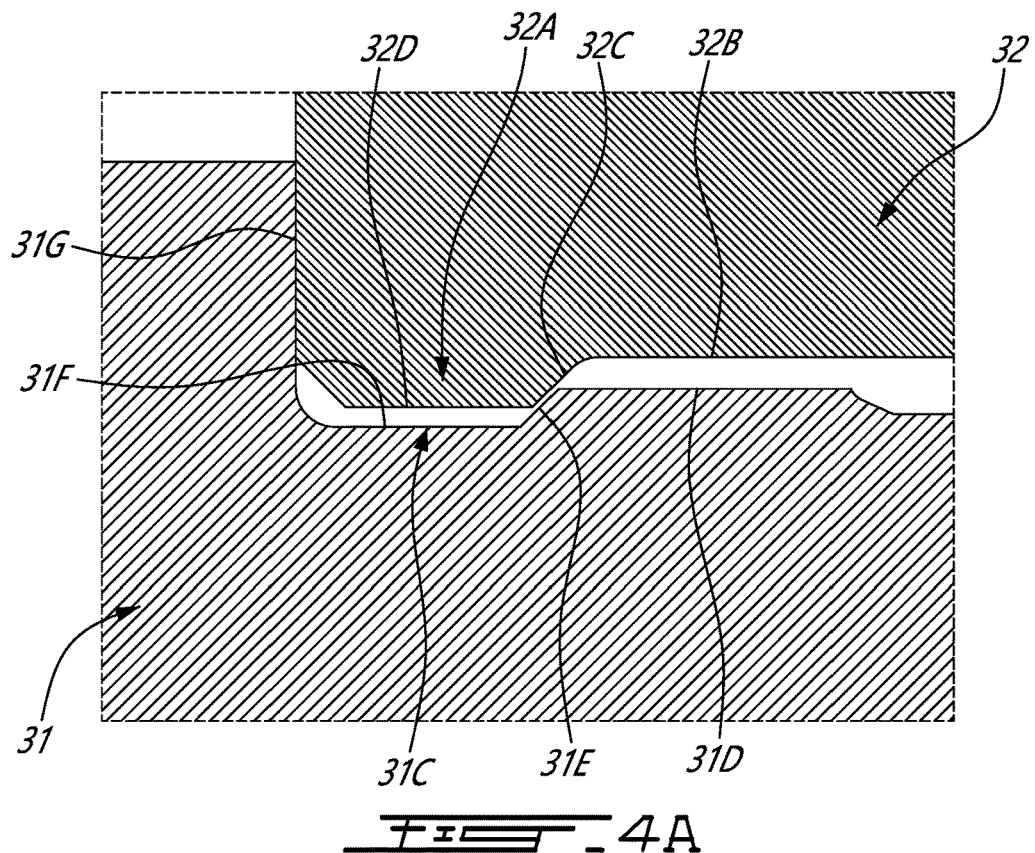
FIG. 4A is an enlarged view of a portion of FIG. 3 illustrating a retaining ring and a support flange in a first relative position when the gas turbine engine is powered off.

Referring now to FIG. 4A, the flange recess 31C is bounded on a first axial side by a sloped recess face 31E. The sloped recess face 31E extends radially outwardly and axially from a bottom face 31F of the flange recess 31C. The ring protrusion 32A defines a sloped protrusion face 32C that extends radially outwardly and axially from an end face 32D of the ring protrusion 32A. The sloped protrusion face 32C is in abutment against the sloped recess face 31E.

Figure 4B:
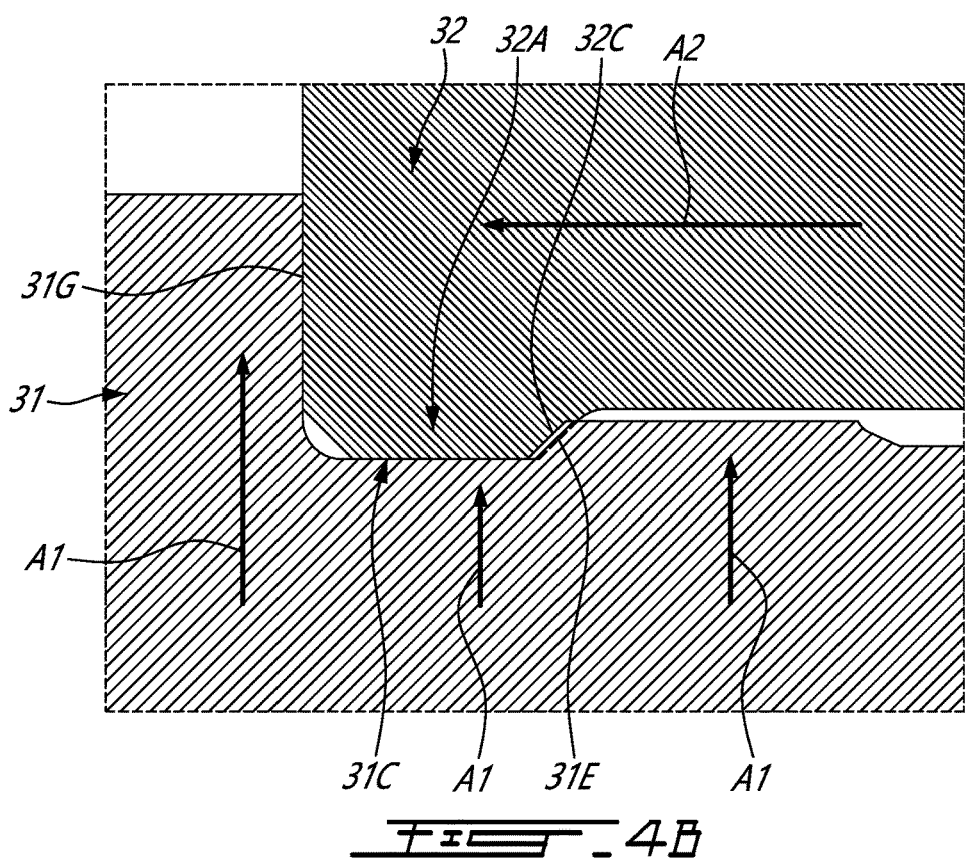
FIG. 4B is an enlarged view of the portion of FIG. 3 illustrating the retaining ring and the support flange in a second relative position when the gas turbine engine is running.

Referring to FIGS. 4A-4B, the support flange 31 is movable in a radial direction relative to the central axis 11 toward the retaining ring 32 between a first position depicted in FIG. 4A to a second position depicted in FIG. 4B. The first position corresponds to a state in which the gas turbine engine 10 is powered off and at a temperature corresponding to that of an environment in which the gas turbine engine 10 is located and the second position corresponds to a state in which the gas turbine engine 10 is powered on and at steady-state operational temperatures. The temperature of the retaining ring 32 and support flange 31 in the first position of FIG. 4A may be about 70 degrees Fahrenheit, whereas, in the second position of FIG. 4B, the temperature of the retaining ring 32 and support flange 31 may be about 350 degrees Fahrenheit. A radial distance relative to the central axis 11 between the end face 32D of the ring protrusion 32A and the bottom face 31F of the flange recess 31C is less in the second position of FIG. 4B then it is in the first position of FIG. 4A. In other words, the ring protrusion 32A extends deeper inside the flange recess 31C in the second position than in the first position.

Because both of the sloped recess face 31E and the sloped protrusion face 32C are substantially parallel to one another and angled relative to the central axis 11, radial movements between the retaining ring 32 and a support flange 31 translates into an axial movement along the central axis 11 between the retaining ring 32 and a support flange 31. More specifically, and in the embodiment shown, upon the retaining ring 32 and the support flange 31 increasing in their respective diameters because of the thermal expansion along directions depicted by arrows A1 on FIG. 4B, the retaining ring 32 moves axially along a direction depicted by arrow A2 until it abuts a shoulder 31G defined by the support flange 31 on a second axial side of the flange recess 31C and that is facing the retaining ring 32. The shoulder 31G may extend substantially perpendicularly from the outer flange face 31B of this support flange 31. In operating temperatures, the retaining ring 32 may be biased against the shoulder 31G by the engagement of the two sloped faces 31E, 32C.

Therefore, at each cooling and heating cycle, engagement of the two slope faces 32C, 31E pushes the retaining ring 32 toward the shoulder 31G and realigns the ring protrusion 32A with the flange recess 31C. Consequently, the retaining ring 32 may remain properly engaged to the support flange 31 regardless of the number of cooling and heating cycles the gas turbine engine 10 is subjected to. In other words, the ramp between the parts may cause the retaining ring 32 to be seated during every thermal cycle. The retaining ring 32 may be installed by thermal differential between the support flange 31 and retaining ring 32. The normalization of temperatures may produce an interlock as explain above. In the present embodiment, the retaining ring 32 may remain engaged to the support flange 31 without any fasteners. In other words, engagement of the retaining ring 32 to the support flange 31 may be free of fasteners.

Referring now to FIG. 5, a method of mounting the component 22 to the inner casing 24 of the gas turbine engine 10 is shown at 500. The method 500 includes engaging the connecting section 22A of the component 22 to the support flange 31, which is secured to the inner casing 24, at 502. As previously explained, the support flange 31 includes a first material. Then, the method 500 includes disposing the retaining ring 32 around the support flange 31 and in abutment against the support flange 31 to sandwich the support flange 31 between the connecting section 22A and the retaining ring 32, at 504. As previously explained, the retaining ring 32 includes a second material that has a coefficient of thermal expansion that is less than that of the first material.

In the embodiment shown, the disposing of the retaining ring 32 around the support flange 31 includes inserting the ring protrusion 32A of the retaining ring 32 inside the flange recess 31C of the support flange 31. In the present embodiment, the method 500 includes putting the two sloped faces 32C, 31E against one another such that thermal expansion of the support flange 31 in the radial direction relative to the central axis 11 induces an axial movement of the retaining ring 32 relative to the support flange 31.

According to at least some embodiments would like but the ring 32 is designed to have an interference fit with the support flange 31. At assembly, the support flange 31 will be cooled so the ring 32 can be easily pressed on and locked into place when it reaches normal temperatures. The thickness of the ring 32 will be balanced against the thickness of the flange 31 to produce an expansion rate at the spigot fit to match the mating component (e.g. the generator).

According to at least some embodiments, the geometry defined by the contact diameters between the support flange and the retaining ring, the relative thickness of the flange spigot and retaining ring, the relative expansion coefficient between the two materials of the support flange and the retaining ring, and the Young modulus of the two materials are all selected in combination relative to the characteristics of the operating envelope of the support flange such that thermal expansion of the support flange is impeded by the retaining ring.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a casing extending circumferentially around a central axis;
a support flange secured to the casing and extending circumferentially around the central axis, the support flange having an inner flange face facing the central axis and an outer flange face facing away from the central axis, the support flange including a first material, the support flange defining a flange recess and a flange protrusion axially offset from the flange recess, the flange recess located radially inwardly of the outer flange face, the flange protrusion protruding radially outwardly from the outer flange face;
a component drivingly engaged by a shaft of the aircraft engine, the component having a connecting section extending around the central axis, the connecting section having a connecting face facing away from the central axis, the inner flange face in abutment against the connecting face; and
a retaining ring extending circumferentially around the central axis, the retaining ring in abutment against the outer flange face of the support flange, the retaining ring including a second material having a coefficient of thermal expansion being less than that of the first material of the support flange, the retaining ring having a ring protrusion received within the flange recess, the retaining ring having a ring recess axially offset from the ring protrusion and receiving the flange protrusion, the support flange having a sloped recess face in abutment against a sloped protrusion face of the ring protrusion.

2. The aircraft engine of claim 1, wherein an axial width of the ring recess is greater than an axial width of the flange protrusion.

3. The aircraft engine of claim 2, wherein the outer flange face is movable toward the retaining ring between a first position when the aircraft engine is powered off and a second position when the aircraft engine is running, a radial distance relative to the central axis between an end face of the ring protrusion and a bottom face of the flange recess being less in the second position than in the first position.

4. The aircraft engine of claim 1, wherein the retaining ring moves axially relative to the support flange between the first position and the second position via the abutment of the sloped recess face the sloped protrusion face.

5. The aircraft engine of claim 4, wherein the support flange defines a shoulder extending radially outwardly from the outer flange face, the shoulder facing the retaining ring, the retaining ring biased against the shoulder in the second position by an interaction between the sloped protrusion face and the sloped recess face.

6. The aircraft engine of claim 1, wherein the connecting face and the inner flange face are biased against one another via a compression fit.

7. The aircraft engine of claim 1, wherein the second material is titanium.

8. The aircraft engine of claim 1, wherein the component is a generator.

9. A connecting system for connecting a component to a casing of an aircraft engine, comprising:
a support flange secured to the casing, the support flange extending circumferentially around an axis, the support flange having an inner flange face facing the axis and an outer flange face facing away from the axis, the support flange including a first material, the inner flange face in abutment against a connecting section of the component, the support flange defining a flange recess and a flange protrusion axially offset from the flange recess, the flange recess located radially inwardly of the outer flange face, the flange protrusion protruding radially outwardly from the outer flange face; and a retaining ring extending circumferentially around the axis, the retaining ring in abutment against the outer flange face of the support flange, the retaining ring including a second material having a coefficient of thermal expansion being less than that of the first material of the support flange such that thermal expansion of the support flange is impeded by the retaining ring, the retaining ring having a ring protrusion received within the flange recess, the retaining ring having a ring recess axially offset from the ring protrusion and receiving the flange protrusion, the support flange having a sloped recess face in abutment against a sloped protrusion face of the ring protrusion.

10. The connecting system of claim 9, wherein an axial width of the ring recess is greater than an axial width of the flange protrusion.

11. The connecting system of claim 10, wherein the outer flange face is movable toward the retaining ring between a first position when the aircraft engine is powered off and a second position when the aircraft engine is running, a radial distance relative to the axis between an end face of the ring and a bottom face of the flange recess being less in the second position than in the first position.

12. The connecting system of claim 9, wherein the retaining ring moves axially relative to the support flange between the first position and the second position via the abutment of the sloped recess face the sloped protrusion face.

13. The connecting system of claim 12, wherein the support flange defines a shoulder extending radially outwardly from the outer flange face, the shoulder facing the retaining ring, the retaining ring biased against the shoulder in the second position by an interaction between the sloped protrusion face and the sloped recess face.

14. The connecting system of claim 9, wherein the connecting section and the inner flange face are biased against one another via a compression fit.

15. The connecting system of claim 9, wherein the second material is titanium.

16. The connecting system of claim 9, wherein the component is a generator.

17. A method of mounting a component to a casing of an aircraft engine, comprising:

engaging a connecting section of the component to a support flange secured to the casing, the support flange including a first material; and disposing a retaining ring around the support flange and in abutment against the support flange to sandwich the support flange between the connecting section and the retaining ring, the retaining ring including a second material having coefficient of thermal expansion being less than that of the first material, including inserting a ring protrusion of the retaining ring into a flange recess of the support flange and inserting a flange protrusion of the support flange into a ring recess of the retaining ring, and abutting a sloped recess face of the support flange against a sloped protrusion face of the ring protrusion.

18. The method of claim 17, wherein the inserting of the flange protrusion into the ring recess includes inserting the flange protrusion into the ring having a greater axial width than that of the flange protrusion.

19. The method of claim 17, wherein the support flange defines a shoulder, the abutting of the sloped recess Face of the support flange against the sloped protrusion face of the ring protrusion includes abutting the sloped recess face facing at east partially towards the shoulder, the ring protrusion received axially between the shoulder and the sloped recess face.

* * * * *